United States Patent
Laluet et al.

(10) Patent No.: US 9,477,022 B2
(45) Date of Patent: Oct. 25, 2016

(54) DEVICE FOR VIEWING AN IMAGE ON A LAMINATED SUBSTRATE

(71) Applicant: SAINT-GOBAIN GLASS FRANCE, Courbevoie (FR)

(72) Inventors: Jean-Yves Laluet, Paris (FR); Guillaume Lecamp, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 247 days.

(21) Appl. No.: 14/367,720

(22) PCT Filed: Dec. 20, 2012

(86) PCT No.: PCT/FR2012/053009
§ 371 (c)(1),
(2) Date: Jun. 20, 2014

(87) PCT Pub. No.: WO2013/093351
PCT Pub. Date: Jun. 27, 2013

(65) Prior Publication Data
US 2014/0355106 A1    Dec. 4, 2014

(30) Foreign Application Priority Data

Dec. 22, 2011    (FR) ..................................... 11 62312

(51) Int. Cl.
*G02B 5/20* (2006.01)
*B60J 1/02* (2006.01)
(Continued)

(52) U.S. Cl.
CPC ......... *G02B 5/208* (2013.01); *B32B 17/10036* (2013.01); *B32B 17/1077* (2013.01);
(Continued)

(58) Field of Classification Search
CPC .............. G02B 27/01; G02B 27/0101; G02B 2027/0118; G02B 2027/012; G02B 5/0278; G02B 1/11; G02B 1/115; G02B 2027/0196; G02B 5/0294; B32B 17/10; B32B 17/10036; B32B 17/10761; B32B 2367/00; B32B 17/10541; B32B 17/10678; F21S 11/00; F21S 11/002; F21S 11/007; E06B 9/00; B60J 1/00; B60J 1/001; B60J 1/02; B60J 1/2011; B60J 1/2094; B60J 3/00; B60J 3/007
USPC ....... 359/630, 267, 359, 361, 443, 576, 601, 359/609, 629, 350, 355, 356, 357, 360, 591, 359/597, 598, 885, 888, 890, 892; 345/7, 4
See application file for complete search history.

(56) References Cited

U.S. PATENT DOCUMENTS 3,317,906 A * 5/1967 Baldridge ......... B32B 17/10036
156/99
4,775,583 A * 10/1988 Kawamura ........... B29C 70/086
396/479

(Continued)

FOREIGN PATENT DOCUMENTS

EP    1 793 261    8/2009
EP    2219056 A1 * 8/2010 ........... G02B 6/0051
(Continued)

OTHER PUBLICATIONS

International Search Report issued for International Application No. PCT/FR2012/053009, dated Mar. 4, 2013.

Primary Examiner — Arnel C Lavarias
(74) Attorney, Agent, or Firm — Pillsbury Winthrop Shaw Pittman LLP

(57) ABSTRACT

A glazing panel for a display device, includes an external first transparent pane and an internal second transparent pane, each pane including an external face and an internal face, the glass panes being joined together by an interlayer made of a thermoformable material or by a multilayer sheet incorporating such an interlayer; a protective layer made of an opaque material making contact with the internal face of the external first pane; a masking layer made of an opaque material making contact with the internal face of the internal second pane, the masking layer including apertures forming pictograms; and a uniform layer of a material doped with luminescent species chosen because they absorb light radiation produced by the source generating radiation in the UV or IR range, and re-emit light radiation in the visible range, the uniform layer being placed in the glazing panel, between the masking layer and the protective layer.

20 Claims, 2 Drawing Sheets

(51) Int. Cl.
*B32B 17/10* (2006.01)
*G02B 1/111* (2015.01)
*G02B 27/01* (2006.01)
*F21V 8/00* (2006.01)

(52) U.S. Cl.
CPC ... *B32B17/10348* (2013.01); *B32B 17/10669* (2013.01); *B32B 17/10761* (2013.01); *B32B 17/10788* (2013.01); *B60J 1/02* (2013.01); *G02B 1/111* (2013.01); *G02B 27/0101* (2013.01); *G02B 6/0003* (2013.01); *G02B 6/006* (2013.01); *G02B 6/0095* (2013.01)

(56) References Cited

U.S. PATENT DOCUMENTS

| | | | | |
|---|---|---|---|---|
| 4,936,936 A | * | 6/1990 | Rohrbacher | B32B 27/08 156/239 |
| 5,654,811 A | * | 8/1997 | Spitzer | G02B 27/0093 257/E27.111 |
| 2004/0070551 A1 | * | 4/2004 | Walck | B32B 17/10036 345/7 |
| 2009/0295681 A1 | * | 12/2009 | Kaminski | G02B 27/0101 345/7 |
| 2011/0073773 A1 | * | 3/2011 | Labrot | B32B 17/10 250/461.1 |
| 2013/0050983 A1 | * | 2/2013 | Labrot | B32B 17/10 362/84 |
| 2014/0218803 A1 | * | 8/2014 | Labrot | C09K 11/06 359/630 |

FOREIGN PATENT DOCUMENTS

| | | |
|---|---|---|
| FR | 2 578 797 | 9/1986 |
| FR | 2 929 017 | 9/2009 |
| WO | WO 02/058402 | 7/2002 |
| WO | WO 2009/122094 | 10/2009 |

* cited by examiner

DEVICE FOR VIEWING AN IMAGE ON A LAMINATED SUBSTRATE

CROSS-REFERENCE TO RELATED APPLICATIONS

This application is the U.S. National Stage of PCT/FR2012/053009, filed Dec. 20, 2012, which in turn claims priority to French Application No. 1162312, filed Dec. 22, 2011. The content of both applications are incorporated herein by reference in their entirety.

The invention relates to the field of systems for displaying images projected onto laminated glass supports.

One application of such systems is especially found in the field of generating displays on windows, and particularly in the field of head-up displays (HUDs). These systems allow information, for example images, to be displayed while allowing the observer to simultaneously observe surrounding real images and the displayed information. These displays are used, for example, in aeroplane cockpits, in trains or in automotive vehicles. Thus, the driver may see the displayed information without dropping their gaze from the field of vision in front of the vehicle.

Display systems according to the invention may also be used in architectural applications, if it is desired to use laminated glazing panels comprising illuminating patterns having a background-lighting, back-up, decorative or informative function.

Conventionally, in applications in the automotive field, the additional image is obtained by projecting information onto a windscreen having a laminated structure, i.e. formed by two glass panes and a plastic interlayer.

There are various types of systems for displaying visual information, especially used as driver aids in vehicles.

Certain "head-up" displays project a virtual image that is reflected by the windscreen giving the user the impression of seeing an image formed in front of the vehicle. Other systems project a real image and require the presence of luminescent species in the laminated structure. The layer of luminescent material absorbs radiation in the ultraviolet or infrared range and re-emits in the visible. Phosphors are chosen depending on the wavelength of the incident exciting radiation. When the wavelength is in the UV range, "down conversion" is spoken of. Inversely, when the wavelength lies in the IR range, "up conversion" is spoken of. The image is real and is formed in the plane of the laminated glazing panel.

Regarding driver-aid systems requiring luminescent species (real image), two variants have been described. Application WO 02/058402 describes a HUD system in which the layer of luminescent material entirely covers the area of the windscreen. The desired message is made to appear by locally exciting the phosphors using a complex optical system, equipped with a system for directing the light beam emitted by a UV/IR source comprising galvanometers or micro-mirrors, or a system allowing an image to be formed and projected, such as, for example, an LCD array and relay lenses. These illuminating systems are bulky and expensive.

In the other variant described, for example, in Applications EP 1 793 261 or FR 2 929 017, the layer of phosphorescent material is deposited locally, in the form of pre-printed pictograms that are then illuminated by a simple optical system. The drawback of these pre-printed pictograms, apart from the complexity of the deposition of the phosphorescent material, is the fact that the luminescent molecules have a tendency to migrate within the polymer interlayer. Because of this migration, the outline of the pre-printed pictograms becomes hazy, and in time the pictograms become illegible. Furthermore, the luminescent species have limited lifetimes and gradually bleach under the effect of UV. It is therefore necessary to use robust luminescent species, thereby limiting the number of compounds that can be used.

Furthermore, the various systems described above are designed such that the visual information is displayed in zones used to observe road traffic, in the clear or transparent part of the windscreen. There is therefore a risk that the driver will be distracted, the latter possibly focusing on the displayed information rather than external events. In addition, these systems, for the most part, do not provide sufficient contrast to allow the information to be correctly read under bright external light conditions. To overcome this problem, one solution consists in equipping the systems with high-power light sources, such as UV lasers, which are a danger to health and safety both inside and outside vehicles containing them.

Application WO 2009/122094 describes a laminated windscreen incorporating a HUD display device in which the layer of phosphorescent material, deposited in the form of a pictogram, is positioned on the windscreen in line with an opaque layer of black enamel. This black coating layer is placed behind the phosphorescent layer in the direction of propagation of the incident radiation and absorbs UV. This solution makes it possible to prevent any dangerous escape of the incident radiation into or out of the passenger compartment of the vehicle. It also prevents external radiation from degrading the phosphors.

However, the phosphorescent layer is still difficult to deposit since it must be deposited in the form of a pictogram. The migration of phosphors in the plastic interlayer remains a problem that causes blurring of the printed image: the pictogram becomes hazy, especially under the effect of recurrent intense illumination, which has the effect of periodically raising the glazing panel assembly to very high temperatures.

The present invention provides a device for generating a display on a laminated support, allowing all of the aforementioned problems to be solved, and at a lower cost.

The proposed solution allows the information to be displayed in a specific region of the glazing panel, where the contrast is sufficiently high for the information to be seen only from the inside, without either high-power or complex, because equipped with systems for controlling beam direction, coherent-light excitation sources being required.

In addition, the choice of the luminescent species is no longer dictated by their conversion yield, their lifetime and their tendency to diffuse. This choice may be made on the basis of cost, how easy the luminescent species are to implement, and of the colour generated.

The illuminating device according to the present invention easily meets the specifications of the automotive industry in terms of compactness, vibration resistance, resistance to temperature variations, and price.

More precisely, the present invention relates to a glazing panel for a display device, said glazing panel comprising an assembly of at least:
- an external first transparent pane and an internal second transparent pane, each pane comprising an external face and an internal face, said glass panes being joined together by an interlayer made of a thermoformable material or by a multilayer sheet incorporating such an interlayer;
- a protective layer made of an opaque material making contact with the internal face of the external first pane;

a masking layer made of an opaque material making contact with the internal face of the internal second pane, said masking layer comprising apertures forming pictograms; and a uniform layer of a material doped with luminescent species chosen because they absorb light radiation produced by the source generating radiation in the UV or IR range, and re-emit light radiation in the visible range, said uniform layer being placed in the glazing panel, between said masking layer and said protective layer.

The "internal" face of the panes forming the glazing panel is the face that is turned toward the interior of the assembly, as opposed to the "external" face which is the face turned toward the exterior.

The term "uniform" is understood to mean that the material doped with luminescent species is distributed throughout the layer.

The "apertures forming pictograms" are apertures produced in the masking layer, the shapes of which are adjusted depending on the design of said pictogram.

Advantageously, the uniform layer doped with luminescent species is formed by the interlayer or a portion of the interlayer, the luminescent species being incorporated in said interlayer or said portion of the interlayer.

According to another embodiment, the doped uniform layer is a doped polymer film deposited on an undoped interlayer, a barrier layer optionally being placed between the doped film and the interlayer.

Preferably, the masking layer is located on the internal face of the internal second pane which makes contact with the interlayer or multilayer sheet. The protective layer is located on the internal face of the external first pane which makes contact with the interlayer or multilayer sheet.

The thermoformable material forming said interlayer is chosen from the group consisting of polyvinyl butyrals (PVBs), plasticized polyvinyl chlorides (PVCs), polyurethane (PU) or ethylene vinyl acetates (EVAs).

The masking layer is a black enamel layer, a coat of paint, a layer of opaque ink, or a layer of a tinted or painted polymer such as polyethylene or polymethyl methacrylate, for example.

The protective layer is a black enamel layer, a coat of paint, a layer of opaque ink, or a layer of a tinted or painted polymer such as polyethylene or polymethyl methacrylate, for example.

Advantageously, the masking layer and the protective layer are made of the same material.

Without departing from the scope of the present invention, at least one additional functional film is optionally placed between the two transparent glass panes.

This functional film may be a UV antireflection layer placed on the internal second pane, or a UV reflective layer placed on the external first pane.

The source generating the UV or IR radiation is a light-emitting diode or an array of light-emitting diodes. The generating source may directly illuminate the layer assembly or produce illumination via the edge face.

When illumination is achieved via the edge face, at least one functional layer, made of a material having a refractive index that is lower than the refractive index of the doped layer or interlayer, is advantageously placed between the two transparent glass panes.

The invention also relates to a device for generating a display on a laminated glazing panel, said system consisting of a source for generating light, and of the glazing panel such as described above.

The invention and its advantages will be better understood on reading the following description of non-limiting embodiments, given with reference to the following figures.

FIG. 1 shows a schematic of a device according to the present invention, comprising an assembly of glass panes 6 and 4 and a light source (3a if the illumination is direct, 3b if the illumination is via the edge face).

The glass panes 4 and 6 may be made of mineral glass or of organic glass such as polycarbonate, for example.

Between the two glass panes there is an interlayer sheet 2 made of a plastic such as polyvinyl butyral (PVB), plasticized polyvinyl chloride (PVC), polyurethane (PU), or ethylene vinyl acetate (EVA), or indeed even a thermoplastic multilayer sheet incorporating the interlayer sheet and, for example, having a polyethylene terephthalate (PET) constituent. The succession of layers in such a multilayer sheet is, for example, possibly PVB/PET/PVB.

The phosphors used in the device according to the present invention are phosphors that are conventionally used in luminescence applications and they are chosen depending on the desired colour and on the excitation source employed. Any available phosphor known to respond to UV excitation (down conversion) or IR excitation (up conversion) may be chosen. Such materials may for example be chosen from inorganic phosphors. Mention may be made of oxides, halogenides, chalcogenides, silicates, phosphates, borates and aluminates, most often of metals. To obtain fluorescence, these materials form matrices that are doped with at least one element chosen from the rare earths, for example from Eu, Ce, Pr, Tb, Tm, Dy, Nd, Gd or from the transition metals, for example from Mn, Cr, Ti, Ag, Zn or Cu.

Laser-dye type phosphors may also be used in the context of the present invention, and organic polymers. It is also possible to select phosphors from the nanoscale II-VI or III-V semiconductor structures known in the art as quantum dots.

Organometallic molecules may also be used as phosphors in the context of the present invention. They, for example, consist of a fluorescence centre consisting of at least one metal or rare-earth atom, surrounded by and bonded to organic groups.

It is possible to use just one luminescent species in order to produce monochromatic light. It is also possible to use spatially separate luminescent species in order to obtain a monochromatic display but in a plurality of different colours. A mixture of luminescent species optionally having separate absorption bands may allow a polychromatic display to be obtained.

By way of example, to obtain a display with a blue colour, 2,5-thiophenediylbis(5-tert-butyl-1,3-benzoxazole) or diethyl 2,5-dihydroxyterepthalate are used.

To obtain a red colour, $Eu^{3+}$ complexes with β-naphthoyltrifluoroacetone ligands may be used, and to obtain a green colour, benzoxazinone derivatives may be used.

Figure 1:
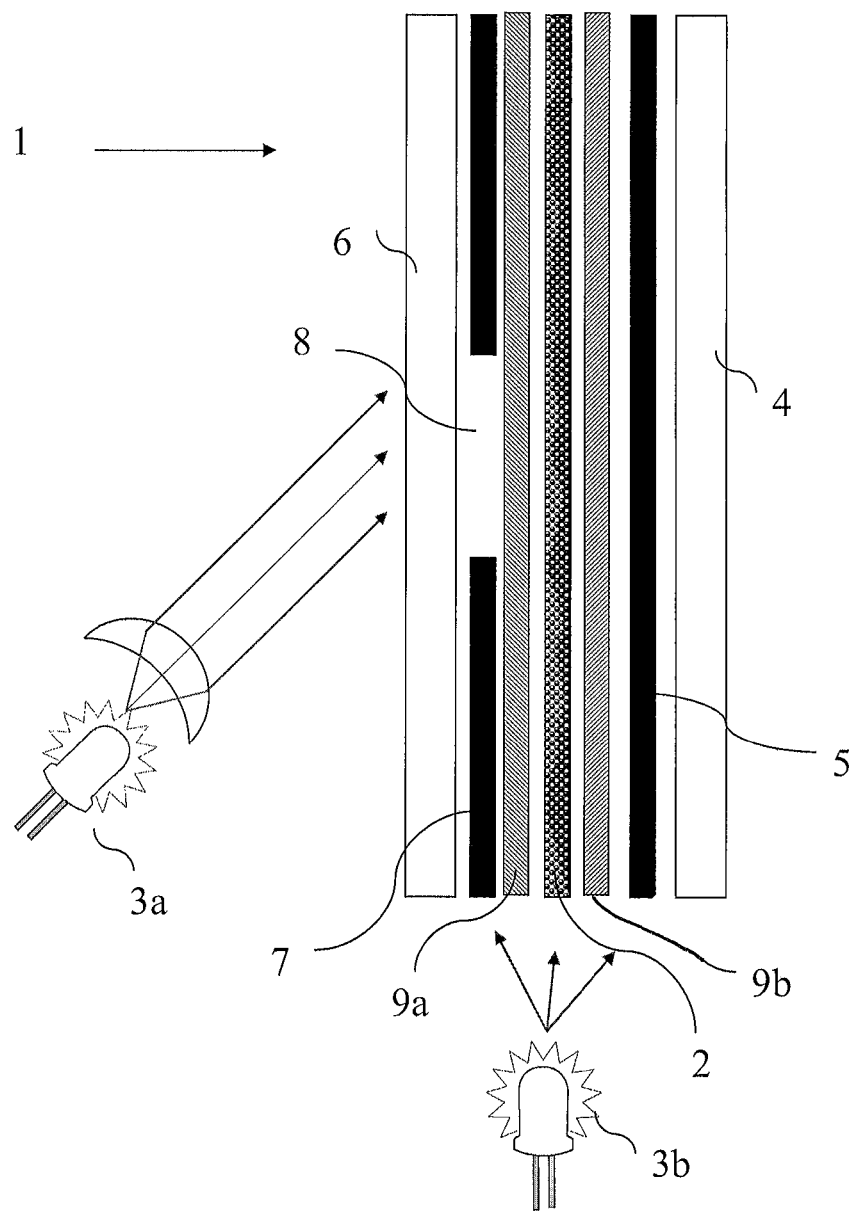
FIG. 1 shows a succession of films forming the device according to the present invention.

In the embodiment shown in FIG. 1, the doped uniform layer according to the invention is formed by the interlayer. Such an interlayer, consisting of a doped polymer, may be conventionally obtained by sputtering the luminescent species onto the surface of the undoped interlayer, by dipping an undoped interlayer in a solution containing the luminescent species, or by mixing the polymer and the luminescent species before the extrusion of the interlayer.

It is also possible, without departing from the scope of the present invention, and according to other embodiments not illustrated here in the figures, to join a doped polymer film to an undoped interlayer. The doped film and the interlayer may optionally be separated by a barrier layer, such as, for example, a film of polyethylene terephthalate (PET).

A protective layer 5 made of an opaque material is deposited on the internal face of the external glass pane 4 before the lamination, i.e. before the various sheets are assembled. The role of this protective layer is three-fold: on the one hand it forms a black background with respect to reading the visual information displayed, and on the other hand it acts as a screen blocking external light, hence the name "protective layer". Finally, this protective layer 5 also prevents any of the incident UV radiation from escaping towards the exterior. The protective layer is necessarily placed behind the layer that contains the phosphors, in the propagation direction of the incident radiation.

The presence of this layer ensures that the contrast of the display device is excellent and that the visual information can be seen even under bright external light conditions. The visual information cannot be read from the exterior and it is therefore possible to use display colours such as red without being confronted with regulatory problems. Furthermore, by virtue of this layer it is possible to ensure that all the incident UV radiation, especially when it is emitted in a concentrated beam (especially by UV diodes or by UV lasers) is stopped and confined to the glazing panel.

The protective layer is opaque and may be made of a black enamel deposited on the glass pane, of an optically opaque paint or ink deposited on the polymer interlayer, or of an opaque, tinted or painted polymer layer joined to and laminated between the external glass pane 4 and the interlayer 2.

The protective layer may be deposited using any technique known in the art.

A masking layer 7 made of an opaque material is deposited on the internal face of the internal glass pane 6 before the lamination. This layer 7 contains apertures 8 forming pictograms 11.

Figure 2:
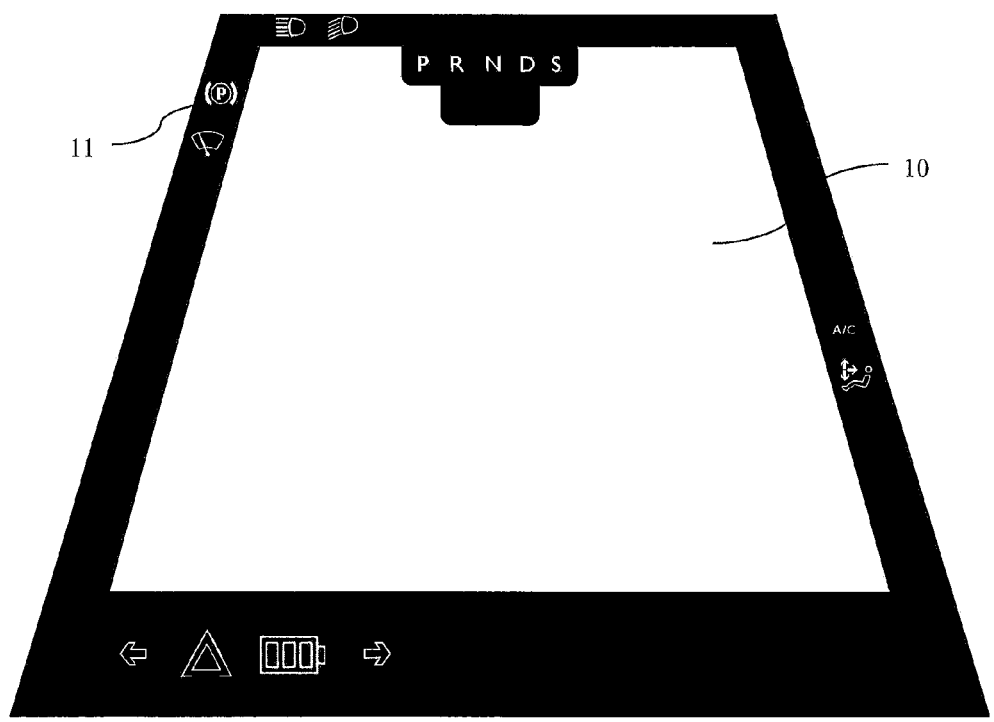
FIG. 2 shows a windscreen comprising visual information displayed using a device according to the present invention.

The expression "apertures forming pictograms" is understood, in the context of the present invention, to mean apertures produced in the masking layer 7, the shapes of which apertures are adjusted depending on the desired design of said pictogram, as illustrated in FIGS. 1 and 2. They are in particular voids (10, 11 in FIG. 2) in the masking layer, i.e. regions free from the masking material (enamel), and the shape of which corresponds to a graphic that is recognized by the driver as representing a simple and instant piece of information when the void is illuminated via the incident UV radiation, said void 10, 11 being backlit by the underlying uniform luminescent layer 2.

Therefore, the visual information is contained in the masking layer. The masking layer is opaque and may be a black enamel deposited on the glass pane, an optically opaque paint or ink deposited on the polymer interlayer or an opaque, tinted or painted polymer layer joined to and laminated between the internal glass pane 6 and the interlayer 2.

The masking layer containing a pictogram(s) may be deposited using any technique known in the art including, by way of nonlimiting example, screen-printing techniques, ink-jet printing techniques or even offset, flexography or photogravure printing techniques.

The layers 9a and 9b are additional functional layers that may optionally be present. It is possible to interpose, between the two glass panes, one or more layers having specific properties. Thus, a layer 9a of a material known to stop reflection of the exciting radiation used may be inserted on the internal second glass pane 6. A UV-reflective layer 9b may be placed on the external first glass pane 4.

It may be envisioned to add a functional layer allowing light extraction to be improved, for example by producing an antireflection multilayer centred on the emission peak of the luminescent material, in contact with the internal glass pane and/or a multilayer that reflects at this wavelength in contact with the external glass pane.

The optionally present functional layer may allow the visual information to be seen more clearly, by producing a hologram centred on the emission wavelength of the luminescent material.

The succession of sheets, shown in cross section in FIG. 1, is the following: external glass pane 4/protective layer 5/(optional) functional layer 9b/interlayer 2 doped with luminescent species/(optional) functional layer 9a/masking layer 7 comprising apertures 8/internal glass pane 6.

The generating source emitting light radiation in the UV or IR and used in the device according to the present invention is advantageously a conventional low-power source. The cost and safety of the illuminating device are easily controllable.

The source used is preferably a light-emitting diode (LED) or an array of light-emitting diodes. Mention will be made, by way of example, of LEDs emitting at 365, 385 and 405 nm. It may be envisioned to use, as an illuminating system, an array of a plurality of diodes, each possibly being controlled separately.

The pictograms may thus be illuminated by one or more LEDs. Collimating optics may possibly be employed.

In contrast to illuminating devices in known prior-art systems, a complex system for controlling the direction of the beam is not required and the visual information does not need to be illuminated at a predefined angle. The illuminating device has the advantage of being very compact and therefore of being easy to incorporate in a vehicle, especially in the passenger compartment. In addition it is very robust and comprises neither fragile nor moveable components.

The excitation source may illuminate the pictograms directly (the case of the source 3a).

According to one embodiment, the source 3b may illuminate the layer multilayer via the edge face. Advantageously, in this configuration, a layer made of a material with a low refractive index is placed between the two glass panes in order to improve the guidance of the light. The layer may for example be a macroporous layer the index of which is between 1.1 and 1.3, or even made of a plastic, such as PET, with an index lower than 1.5.

The device according to the invention may be applied to any laminated support. In the automotive field it may be used in sunroofs, windscreens, laminated side windows, glass units conventionally used for conventional HUD systems, glass instrument-panel elements, etc.

In the context of architectural applications, the invention may be used in laminated glazing panels comprising at least one opaque region, i.e. in lacquered, painted or enamelled glass, etc. This glass may for example be used to form a window, a wall cladding, a partition, a door, a sign, a store window, a mirror, a shelf, a splashback, a floor or a ceiling, a railing, etc. The fluorescent pictograms have many possible applications: signals (location, directions), publicity at a point of sale (logos), home automation (control buttons), decorative or background lighting.

FIG. 2 shows a windscreen 10 on the edges of which visual information is displayed using a device according to the present invention. Conventionally, the peripheral parts of the windscreen are covered with an opaque coating made of black enamel. It is possible to place pictograms 11, in the sense described above, in this peripheral zone.

With the device according to the present invention, when the excitation source is turned off (off state), the information cannot be seen.

The invention claimed is:

1. Glazing panel for a display device, said glazing panel comprising an assembly of at least:
   an external first transparent glass pane and an internal second transparent glass pane, each pane comprising an external face and an internal face, said glass panes being joined together by an interlayer made of a thermoformable material or by a multilayer sheet incorporating such an interlayer;
   a protective layer made of an opaque material making contact with the internal face of the external first pane;
   a masking layer made of an opaque material making contact with the internal face of the internal second pane, said masking layer comprising apertures forming pictograms; and
   a uniform layer of a material doped with luminescent species chosen to absorb light radiation produced by a source generating radiation in a ultraviolet (UV) or infrared (IR) range, and to re-emit light radiation in a visible range, said uniform layer being placed in the glazing panel, between said masking layer and said protective layer.

2. Glazing panel according to claim 1, wherein the doped uniform layer is the interlayer or a portion of the interlayer, the luminescent species being incorporated in said interlayer or said portion of the interlayer.

3. Glazing panel according to claim 1, wherein the doped uniform layer is a doped polymer film deposited on an undoped interlayer, a barrier layer optionally being placed between the doped film and the interlayer.

4. Glazing panel according to claim 1, wherein the masking layer is located on that face which makes contact with the interlayer or multilayer sheet.

5. Glazing panel according to claim 1, wherein the protective layer is located on that face which makes contact with the interlayer or multilayer sheet.

6. Glazing panel according to claim 1, wherein the thermoformable material forming said interlayer is selected from the group consisting of polyvinyl butyrals (PVBs), plasticized polyvinyl chlorides (PVCs), polyurethane (PU) and ethylene vinyl acetates (EVAs).

7. Glazing panel according to claim 1, wherein the masking layer is a black enamel layer, a coat of paint, a layer of opaque ink, or a layer of a tinted or painted polymer.

8. Glazing panel according to claim 1 wherein the protective layer is a black enamel layer, a coat of paint, a layer of opaque ink, or a layer of a tinted or painted polymer.

9. Glazing panel according to claim 1, wherein the masking layer and the protective layer are made of the same material.

10. Glazing panel according to claim 1, wherein at least one additional functional film is placed between the two transparent glass panes.

11. Glazing panel according to claim 10, wherein the functional film is a UV antireflection layer placed on the internal second pane, or a UV reflective layer placed on the external first pane.

12. Glazing panel according to claim 1, wherein the source generating the UV or IR radiation is a light-emitting diode or an array of light-emitting diodes.

13. Glazing panel according to claim 1, wherein the generating source directly illuminates the layer assembly.

14. Glazing panel according to claim 1, wherein the generating source produces illumination via an edge face of the glazing panel.

15. Glazing panel according to claim 14, wherein at least one functional layer, made of a material having a refractive index that is lower than a refractive index of the interlayer, is placed between the two transparent glass panes.

16. Device for generating a display on a laminated glazing panel, comprising a source for generating light, and the glazing panel according to claim 1.

17. Glazing panel according to claim 7, wherein the tinted or painted polymer is polyethylene or polymethyl methacrylate.

18. Glazing panel according to claim 8, wherein the tinted or painted polymer is polyethylene or polymethyl methacrylate.

19. A glazing panel for a display device, said glazing panel comprising:
   an external first transparent pane and an internal second transparent pane, each of the external first transparent and the internal second transparent pane comprising an external face and an internal face, said external first transparent pane and internal second transparent panes being joined together by an interlayer made of a thermoformable material or by a multilayer sheet incorporating such an interlayer;
   a protective layer made of an opaque material making contact with the internal face of the external first transparent pane;
   a masking layer made of an opaque material making contact with the internal face of the internal second transparent pane, said masking layer comprising one or more apertures forming one or more pictograms; and
   a uniform layer of a material doped with luminescent species chosen to absorb light radiation produced by a source generating radiation in a ultraviolet (UV) or infrared (IR) range, and to re-emit light radiation in a visible range, said uniform layer being placed in the glazing panel, between said masking layer and said protective layer.

20. The glazing panel according to claim 19, wherein said external first transparent pane and said internal second transparent pane are made of a mineral or organic glass.

* * * * *